Dec. 20, 1938.  H. P. LUHN  2,140,936
METHOD AND APPARATUS FOR ELIMINATING SINKER LINES AND THE LIKE IN HOSIERY
Filed Aug. 6, 1935  6 Sheets-Sheet 1

INVENTOR
Hans P. Luhn
BY
Hoguet, Neary & Campbell
His ATTORNEYS

Dec. 20, 1938.　　　　　H. P. LUHN　　　　　2,140,936
METHOD AND APPARATUS FOR ELIMINATING SINKER LINES AND THE LIKE IN HOSIERY
Filed Aug. 6, 1935　　　　6 Sheets-Sheet 2
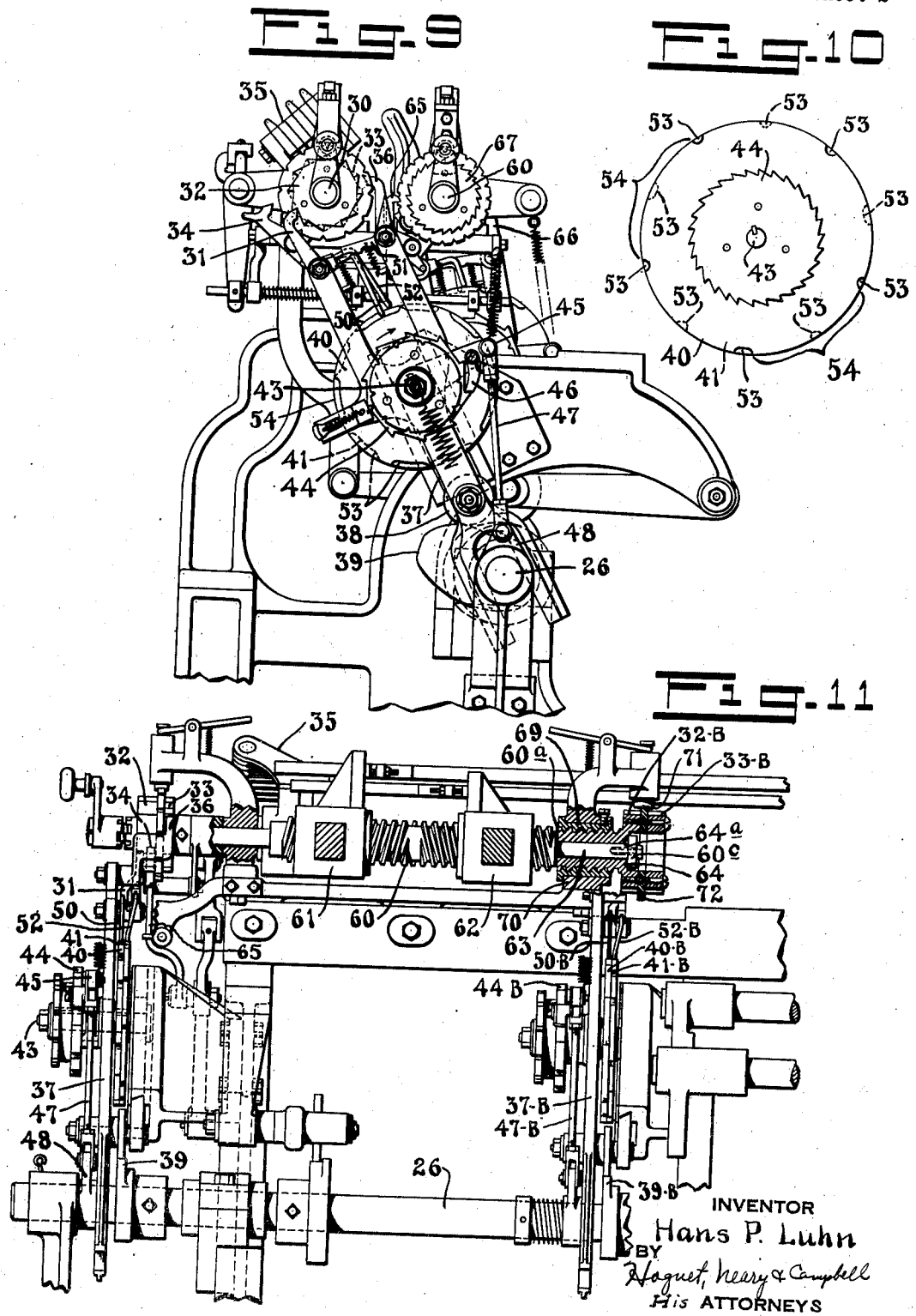
INVENTOR
Hans P. Luhn
BY
Hoguet, Neary & Campbell
His ATTORNEYS Dec. 20, 1938.    H. P. LUHN    2,140,936
METHOD AND APPARATUS FOR ELIMINATING SINKER LINES AND THE LIKE IN HOSIERY
Filed Aug. 6, 1935    6 Sheets-Sheet 3
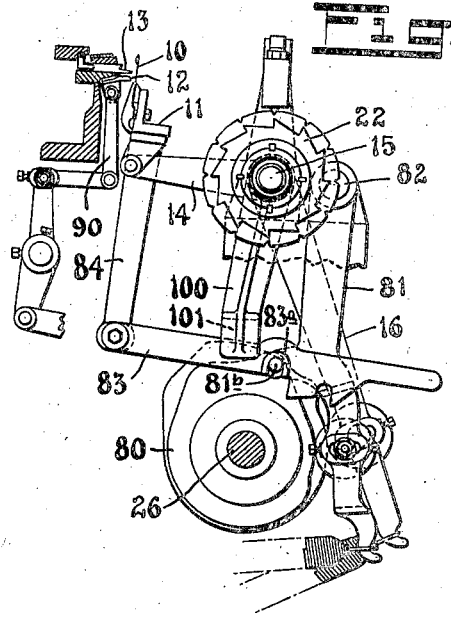
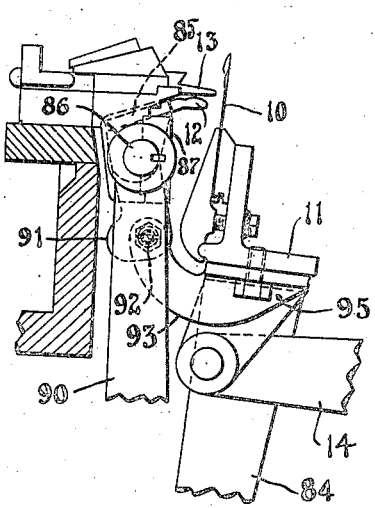
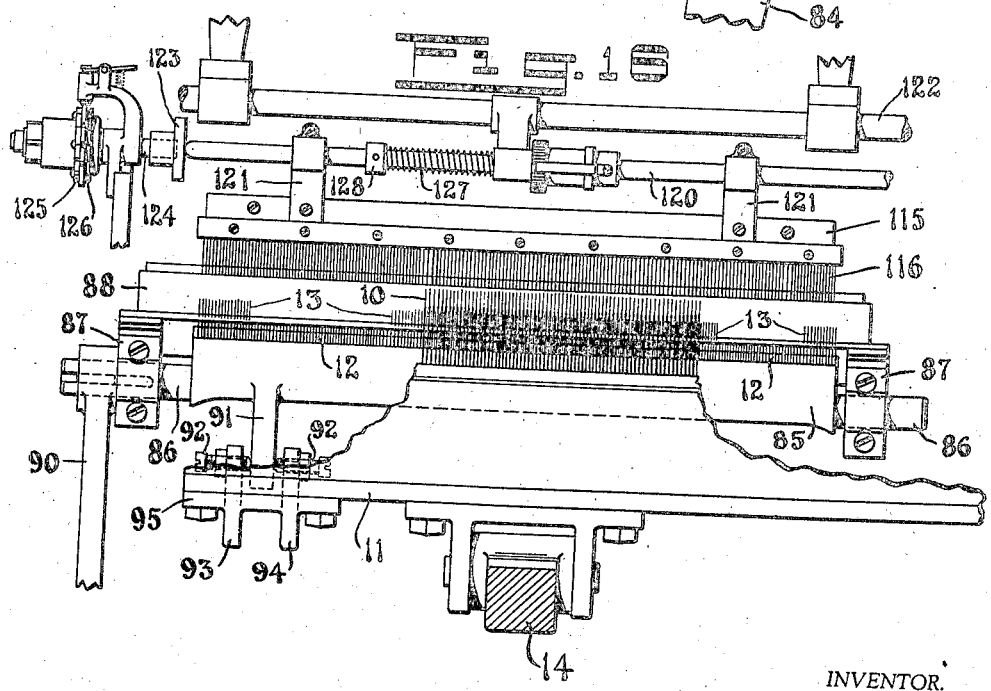
INVENTOR.
Hans P. Luhn
BY Hoguet, Neary & Campbell
His ATTORNEYS

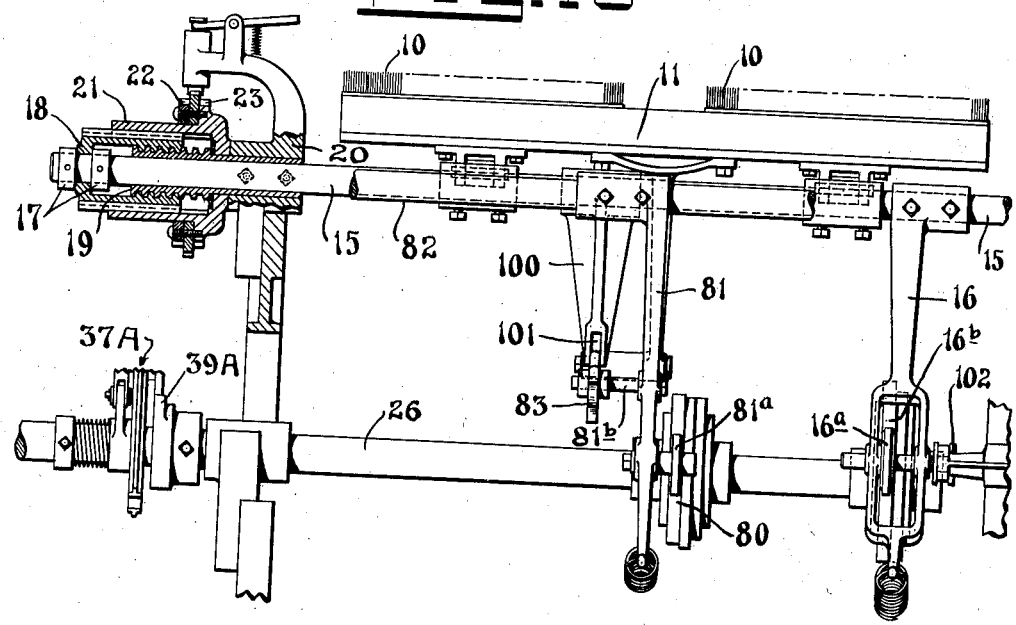

INVENTOR.
Hans P. Luhn
BY
His ATTORNEYS

Dec. 20, 1938.  H. P. LUHN  2,140,936
METHOD AND APPARATUS FOR ELIMINATING SINKER LINES AND THE LIKE IN HOSIERY
Filed Aug. 6, 1935  6 Sheets—Sheet 6
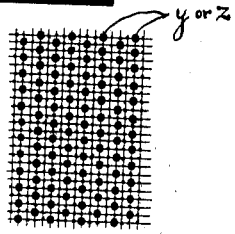
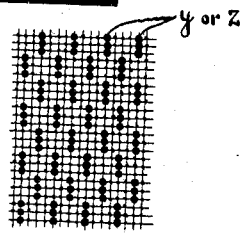
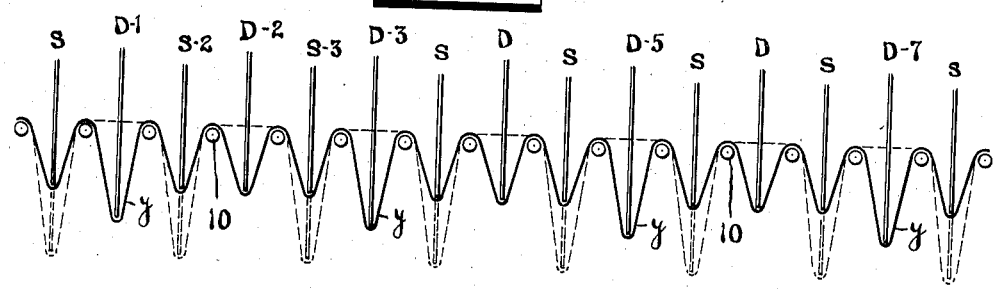
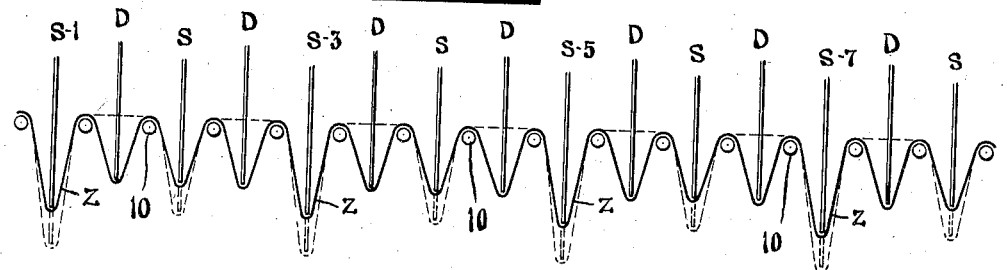
INVENTOR.
Hans P. Luhn
BY Hoguet, Neary & Campbell
His ATTORNEYS Patented Dec. 20, 1938

2,140,936

UNITED STATES PATENT OFFICE 2,140,936

METHOD AND APPARATUS FOR ELIMINATING SINKER LINES AND THE LIKE IN HOSIERY

Hans P. Luhn, New York, N. Y., assignor to Improved Products and Machinery Co. Inc., a corporation of New York Application August 6, 1935, Serial No. 34,885

29 Claims. (Cl. 66—82)

This invention relates to methods of and apparatus for producing knitted fabrics. The methods and apparatus disclosed herein are particularly adapted for use in eliminating so called "sinker lines" or "needle lines" in knitted fabrics.

When knitted fabrics are produced on straight knitting machines of the Cotton type the resulting fabrics are often found to have so-called "sinker lines" or "needle lines" which detract from the appearance of the fabrics, particularly of sheer fabrics such as hosiery.

These lines are usually caused by the recurrence of imperfect loops in corresponding wales of successively knit courses. Usually such loops are imperfect because more tightly or loosely knitted than adjacent loops. The imperfections of particular loops may be minor in extent and not readily measurable nor particularly noticeable at the time they are drawn. But as other courses are knit such loops afford contrasts in the fabric with more nearly perfect loops in adjacent wales and their repetition in corresponding wales course after course produces a visually apparent "line" in the fabric.

Among the factors giving rise to the production of imperfect loops are the following—the sinkers or dividers, respectively, are not properly aligned either among themselves or with respect to each other; some sinkers or dividers have been worn down in use to a greater or lesser extent than adjacent sinkers or dividers; the needles may not all be properly aligned nor positioned at the same heights; a sinker, divider or needle may have its thread engaging portion so worn as to catch and hold the thread at times when it should be permitting other parts to draw sufficient thread to form even loops. Any of these defects in the loop forming and knitting elements may cause some loops to be more tightly or loosely knit than others because of being formed from and knitted with less or more thread than loops in adjacent wales.

Moreover, even if it were possible to readily locate the defective loop forming and knitting elements which cause imperfect loops the mere replacement of such defective elements would not necessarily result in eliminating the imperfect loops and the resulting sinker or needle lines. This is because the defects in such elements are purely relative. The defects in either needles, sinkers or dividers which have an effect in producing imperfections in the fabric are not necessarily related to the departure of the particular element from a new or perfect element but the defect in the condition of the particular element is relative to others adjacent thereto. For example, replacement of a suspected sinker by a new sinker would not eliminate the cause of the lines unless the adjacent sinkers and dividers were also new or practically unworn. In short, because of the fact that some parts are worn to a greater or less extent than others, the replacement of any part would require the substitution therefor of a part which is relatively as perfect or imperfect as the parts adjacent which it is to be positioned or with which it is to cooperate.

An object of the present invention is to eliminate the so-called sinker or needle lines that result from the recurrence of relatively imperfect loops in the same whale of successively knit courses.

On the other hand, by wilfully introducing at certain points elements such as sinkers or dividers which are defective in the sense that they are not of exactly the same size or in the same condition of wear as adjacent elements, fabric loops may be caused to be formed which are intentionally imperfect; that is loops would be produced which would be larger or smaller than those in adjacent wales. Under such conditions, shifting of the loop forming and knitting elements relatively to each other will result in producing a pattern in the fabric.

Accordingly, another object of the invention is to provide a patterned effect in a fabric by wilfully forming imperfect loops and shifting the various knitting elements relatively to each other.

In carrying out the invention, the positions of the fabric loops relatively to the loop forming and knitting mechanism are repeatedly varied during formation of the fabric so that imperfect loops which ordinarily would occur in the same wale in successive courses are dispersed over a plurality of wales. Where these imperfect loops result from elements which are defective because of wear or improper alignment, the resulting loops do not become aligned in such manner as to form a line of imperfect loops contrasting with the loops in adjacent wales. Where the imperfect loops result from the action of defective elements that have intentionally been introduced into the machine, the resulting loops are formed into a pattern in the fabric by shifting of the elements relatively to each other as successive courses are knit.

In the drawings:

Figure 9 is an end elevation corresponding to Figure 8.

Figure 10 is an enlarged detailed view of part of the mechanism shown in Figure 9.

Figure 11 is a fragmentary front elevation showing mechanism provided for shifting the carrier-rod end-stops and the narrowing rod stops in accordance with the present invention.

Figure 12 is an enlarged vertical sectional view showing mechanism for shifting the needle bar.

Figure 13 is a front elevation, partly broken away, showing mechanism for shifting the needle bar.

Figure 14 is a plan view corresponding to Figure 15.

Figures 15 and 16 are enlarged fragmentary side and front elevations respectively of mechanism for shifting the knockover bits.

Figure 19 is a diagrammatic illustration of a portion of a knitted fabric having a patterned effect produced by intentionally forming imperfect loops in certain wales and varying the positions of the fabric loops relatively to the loop forming and knitting elements after each course is knit.

Figure 20 is a similar diagram of a patterned effect produced by varying the position of the fabric loops relatively to the loop forming and knitting elements after a plurality of courses have been knit.

Figure 21 is a diagrammatic view illustrating the manner in which in certain wales loops are produced of sizes different from those in adjacent wales by replacing certain of the dividers with dividers that are longer than the remainder of the series; and Figure 22 is a similar diagrammatic view illustrating the use for certain wales of sinkers that are longer than the remainder of the series of sinkers.

In Figures 1 to 7 the dots represent fabric loops, their horizontal and vertical alignments, respectively, representing the courses and wales of the fabric. The heavier dots $a$ exaggeratedly represent imperfectly formed loops produced by improperly aligned, defective or imperfectly operating loop forming and knitting elements. As is apparent from Figure 1, when imperfect loops recur in the same wale of successively knit courses they align with each other and by contrast with more perfectly formed loops in adjacent wales afford the appearance of a line in the fabric.

Figure 1:
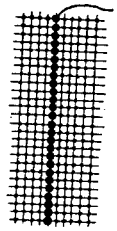
Figure 1 is a diagrammatic illustration of a portion of a knitted fabric showing, in exaggerated form, a sinker or needle line resulting from the recurrence of relatively imperfect loops in the same wale of successively knit courses.

Figures 2 to 7 illustrate dispersion of the imperfect loops over a number of courses so that the contrasting line shown in Figure 1 is broken up.

The methods

Figure 5:
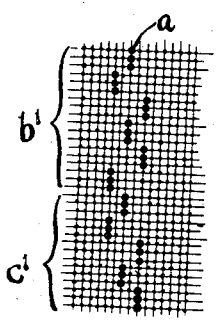
Figure 6:
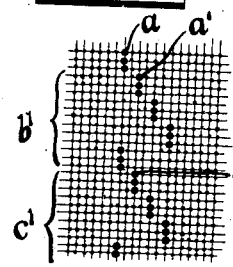
Figure 7:
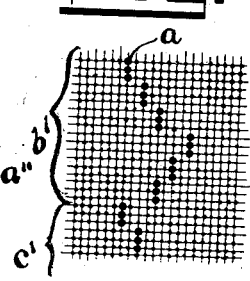

In accordance with the invention the imperfect loops are dispersed among a plurality of wales by varying the relative positions of the loops of the fabric and the elements of the machine which form and knit the loops. The invention embraces several methods by which variations in the positions of the fabric loops relatively to the loop forming and knitting elements may be effected. These methods involve changing the positions of the loop forming and knitting elements relatively to the fabric and to each other in the periods between the knitting of certain courses and the formation of the loops of the next succeeding courses. These variations may be effected either after the knitting of each course (Figures 2 to 4) or at other intervals during knitting of the fabric (Figures 5–7).

First method

One method of eliminating sinker or needle lines in accordance with this invention is to shift the needle bar axially after the knitting of a particular course. The successive shiftings may alternate in direction and vary in extent. Or a number of successive shiftings may be in one direction and other subsequent shiftings in the opposite direction. Thus, when successive courses are formed and knitted, the active needles are disposed in cooperative relation with different sinkers and dividers than those with which they were associated during the knitting of preceding courses.

In shifting the needles the knockover bits may also be shifted therewith. Alternatively, the needles may be withdrawn from between the knockover bits before the needles are shifted with respect to the knockover bits, sinkers and dividers.

In following this method, the end stops for the carrier rods are shifted to the same extent as the needles so that the carriers are maintained properly aligned with the fabric.

When narrowing is to be effected by means of the usual narrowing points, the narrowing rod stops are also shifted in accordance with the shifting of the needles in order to maintain the narrowing points aligned with the fabric.

As a result, the fabric loops are shifted several needle spaces relatively to the sinkers and dividers so that the wale in which an imperfect loop was last formed is similarly displaced from a defective sinker or divider and the defective element forms loops for the next course in a different wale. Thus, the defective loops are dispersed among several wales.

Second method

A second method of eliminating lines in the fabric by varying the relative positions of the fabric loops and the knitting elements is to shift the sinkers and dividers longitudinally of the line of active needles.

Third method

A third method is to periodically transfer all the loops of the fabric from engagement with the needles employed in knitting a particular course to other needles spaced therefrom so that in the formation of the succeeding courses the loops are formed and drawn by different needles and sinkers and dividers than those employed in the preceding course.

In practicing this method the needle-bar might then be shifted in the opposite direction to the same extent as the transfer of the fabric. Hence, while the relation between the loops and the needles has been changed, the relation between the fabric and the thread carriers and narrowing points is the same as in previous courses and it is unnecessary to shift the stops for the carrier rods or the narrowing rods. Alternatively, these parts may be shifted in accordance with the extent of transfer of the fabric in order to maintain the carriers and narrowing points aligned with the fabric.

Certain of these methods may be combined and carried out at the same time in order to vary the relative positions of the loops of the fabric and the knitting elements. That is, the needles, sinkers and dividers may be shifted at the same time and the fabric may also be transferred. As a result, an infinite variation may be attained in the relative positions between the fabric loops and the knitting elements in forming successive courses.

The apparatus in general

The apparatus of the invention will be described in conjunction with a full-fashioned knitting machine which is of conventional construction except for the provision of such additional mechanisms, or modifications made in the usual mechanisms, as are required or desirable for carrying out the invention. Accordingly, to simplify the present description many of the mechanisms usually embodied in such machines will, if referred to at all, be described only briefly; and generally with reference only to their function. To further avoid unnecessary description and illustration, those parts of the knitting machine which, in a commercial embodiment, would ordinarily be provided in each of the several sections, at each end of the machine, or elsewhere, will be described herein as though not duplicated. However, it is to be understood that the usual mechanisms and those particularly appertaining to this invention have as many counterparts as may be required, desirable or convenient. The relation of conventional mechanisms to those especially provided for the purposes of the present invention will be apparent to those skilled in the art from the following description.

Shifting of the needle bar

Referring first to Figures 12 to 14: The needles 10 are mounted in a needle bar 11 and supported in the usual cooperative relation with the knock-over bits 12 and the sinkers and dividers (designated collectively by the numeral 13) by means of the arms 14 secured to the needle bar shaft 15. In ordinary practice all of the needles are not active. However, if desired, a number of extra sinkers, dividers and knock-over bits may be provided to accommodate the shifting of the needle bar in accordance with this invention.

Shaft 15 is connected with the lever 16 that controls the vertical movement of the needles. It is also provided with fixed collars 17 (Figure 13) for positioning an internally threaded sleeve 18 that is rotatably mounted thereon. The threads of sleeve 18 engage a similarly, but externally, threaded sleeve 19 fixedly mounted in the part 20 of the machine frame. A third sleeve 21 is rotatable on the fixed sleeve 19 and so mounted on the shaft sleeve 18 as to rotate the latter while permitting the sleeve 18 to move in opposite directions for displacing shaft 15 axially.

Such rotative movements of sleeves 21, 18 to shift the needle bar shaft 15 take place when reversely cut ratchets 22 and 23 secured to sleeve 21 are selectively actuated by related pawls operated through a linkage 37A by an eccentric cam 39A fixed on the main cam shaft 26 of the knitting machine. This cam operated linkage for selectively actuating the ratchets 22, 23 to move the needle bar axially in either direction is identical with that to be presently described as utilized to shift both sets of end-stops for the carrier-rods in the same direction.

Shifting of the carrier-rod end-stops

Figure 8:
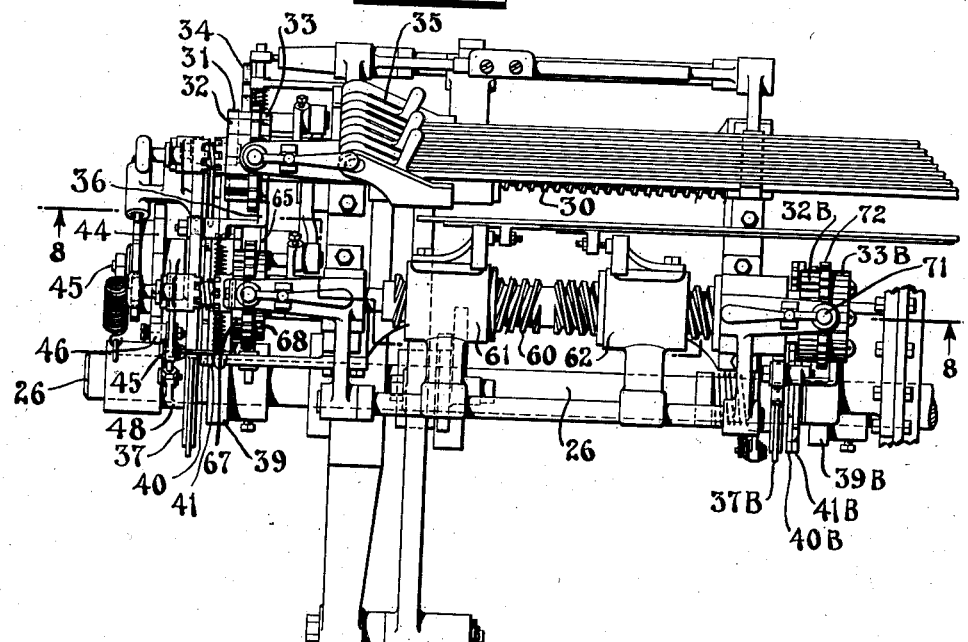
Figure 8 is a plan view of part of the mechanisms at one end of a full fashioned knitting machine embodying apparatus for carrying out the present invention.

The needle bar ratchets 22, 23 mentioned above correspond with the ratchets 32, 33 fixed to the carrier rod screw 30, Figures 8, 9 and 11.

The ratchet 32 is usually provided but herein has tooth faces of increased width to permit engagement by a pawl 31, Figure 9, in addition to the pawl 34, which is ordinarily employed to move the carrier-rod end-stops 35 inwardly for narrowing, etc. The ratchet 33 and pawl 36 therefor are provided to effect outward movement of the carrier-rod end-stops. Pawls 31 and 36 are biased toward engagement with their ratchets and are pivotally mounted on opposite bifurcations at the upper end of a suitably guided reciprocable member 37. The other end of member 37 is also bifurcated to straddle cam shaft 26 and is provided with a cam roller 38 maintained in engagement with an eccentric cam 39 secured to the cam shaft.

The present invention contemplates that desired variations may be effected in the extent of shifting of the carrier-rod end-stops, etc. Accordingly, the portion of the upward stroke of member 37 during which the operative pawl is permitted to engage and advance its ratchet is determined by cams 40 and 41 controlling the pawls 31 and 36, respectively. These cams are removably secured to a stub shaft 43 mounted in the member 37 and having a ratchet 44 fixed thereto. An arm 45 loosely mounted at one end on stub shaft 43 carries a pawl 46 biased into engagement with ratchet 44. Connected at one end to arm 45 is a link 47 which at its other end is held against movement with member 37 as by connection to a non-rotating collar 48 on cam shaft 26, or to a convenient frame part. The restraint exercised on link 47 by anchoring it at one end causes the arm 45 to pivot on stub shaft 43 as member 37 is raised with the result that pawl 46 actuates ratchet 44 and advances cams 40 and 41 through a certain angle in each cam shaft cycle or knitting period, after formation and knitting of the loops.

The pawl 31 for effecting inward movement of the carrier-rod end-stops is provided with a tail 50 engaging the periphery of cam 40. The tail 51 of the pawl 36 for effecting outward movement of the carrier stops rests upon a member 52 that contacts the periphery of the cam 41 and which is formed like and pivoted on the same bifurcation as the tail 50. The difference in the relations of the two pawls to their cams is to attain convenient and smooth operation in view of the direction of cam movement.

Although both pawls 31, 36 may be simultaneously disengaged from their ratchets by the related cams, they are alternatively effective since one causes movement of carrier-rod screw 30 in one direction and the other in the opposite direction. Both pawls may effect variable movement of the carrier rod stops under the control of their respective cams which function in like manner. The cam 40, for example, has raised portions, or nodes, 53 which disengage the pawl and intervening dwells 54 that permit its engagement, the relative proportions of the nodes 53 and dwells 54 determining the period of actuating engagement of the pawl 31 with ratchet 32 during the upward strokes of member 37.

For example, if cams 40 and 41 are arranged to be rotated through increments of one-tenth of a revolution or 36° by member 37, the pawls controlled thereby may advance the related ratchets during say, one-third, two-thirds or all of this 36° increment of cam movement, according to the relative extents of the node and dwell in this part of the cam. Thus, a movement of the carrier rod stops over none, all, or a selectively controlled part of a three step range per knitting cycle (course) is provided. Where each step represents two needle spaces the carrier-rod end-stops may be shifted two, four or six needle spaces, in either direction according to whether pawl 31 or 36 is operating in the idle portion of each knitting course cycle. The stops for the other ends of the carrier-rods are similarly operated so that both sets are shifted either to right or left at the same time, rather than toward each other, as through pawls 34 for narrowing. The above movement figures are merely illustrative and are not to be considered as limiting the invention in any way.

The shifting of the needle bar corresponds with that of the carrier-rod end-stops, as does that of the narrowing stops to maintain the narrowing points positioned in proper alignment with the fabric.

Shifting of the narrowing stops

As shown in Figure 11, the narrowing bar spindle 60 is provided with ratchets 32B and 33B operated and controlled by a linkage 37B corresponding with that just described, and the parts of which, where designated, bear like numerals with the suffix "B". The narrowing stop nuts 61 and 62 are conventionally associated with reversely threaded portions of spindle 60. The ratchets 32B and 33B act to move this spindle bodily in opposite axial directions to shift both stops in the same direction simultaneously.

The reduced portion 63 of narrowing spindle 60 is journalled in a sleeve bearing 64 to which the ratchets 32B and 33B are secured. The axial position of sleeve 64 with respect to spindle 60 is maintained by a shoulder 60a on the spindle and a disc 60c secured to the latter and engaging an internal shoulder 64a on the sleeve. This arrangement causes the spindle 60 to follow axial movements of the sleeve 64 and yet permits rotation of spindle 60 without axial movement when it is turned through the pawls 65, 66 acting on ratchets 67, 68, Figures 8, 9, in narrowing operations. The sleeve 64 is threadedly engaged within a sleeve 69 secured to the frame part 70, with the result that when the ratchets 32B, 33B are selectively operated, the sleeve is moved axially carrying spindle 60 therewith to shift both narrowing stops 61 and 62 in the same direction. To maintain engagement with their actuating pawls on shifting of the sleeve 64, the ratchets 32B, 33B have wide tooth faces. Likewise the end of the plunger 71 that engages the notched positioning disc 72 is widened to maintain engagement with the disc when sleeve 64 is shifted. Plunger 71 acts to prevent rotation of the sleeve 64 and ratchets 32B and 33B thereon when the pawls 65 and 66 actuate spindle 60 for varying the relative positions of the narrowing stops 61, 62 for narrowing operations.

Shifting of the knock-over bits

The presser cam 80 controlling the lever 81 on presser shaft 82 (Figure 12) and acting through levers 83, 84 to effect the usual horizontal movements of the needles may readily be modified to clear the needles 10 from the knock-over bits 12 before shifting of the needle bar is effected as described above. As an alternative the knock-over bits may be shifted with the needle bar thus obviating the necessity for clearing the needles from between the knock-over bits.

As illustrated in Figures 15 and 16, the knock-over bit bed 85 has trunnions 86 journalled in the bracket like parts 87 secured to the sinker bed 88, clearance being provided between the knock-over bit bed proper and the parts 87 to permit relative movement of the two beds. The link 90 for imparting the usual movements to the knock-over bits is keyed to the trunnions 86. Lugs 91 depending from the bed 85 are adjustably connected by screws 92 between the bifurcations 93, 94 of brackets 95 secured to the needle bar 11 so that the latter in its movements carries the knock-over bits 12 therewith.

During shifting of the needle bar and knock-over bits the roller 81a (Figures 13, 14) carried by presser lever 81 remains in cooperative relation with cam 80. The associated lever 83 is maintained in proper relation therewith by a bracket 100 fixed on needle bar shaft 15 and slotted at 101 to engage and slide the lever on the usual stud 81b carried by lever 81 and seated in the notch 83a of lever 83. The sides of the slot 101 in the bracket 100 closely engage the side faces of lever 83 to cause it to follow the needle bar without skewing relatively to lever 81. The bracket slot 101 is provided with vertical clearance to permit the customary manual operations of lever 83.

Inasmuch as the lever 16 for effecting vertical movements of the needles also partakes of the axial movements of the needle bar shaft 15, being secured thereto, the spindle of the associated cam roller 16a is secured at one end to a part 102 (Figures 13, 14) attached to the frame. Thus, the roller 16a remains positioned to engage the related cam 16b while the yoke portion of lever 16 that supports the roller spindle slides thereon as the lever moves with the needle bar shaft.

Shifting of the sinkers and dividers

Figure 17:
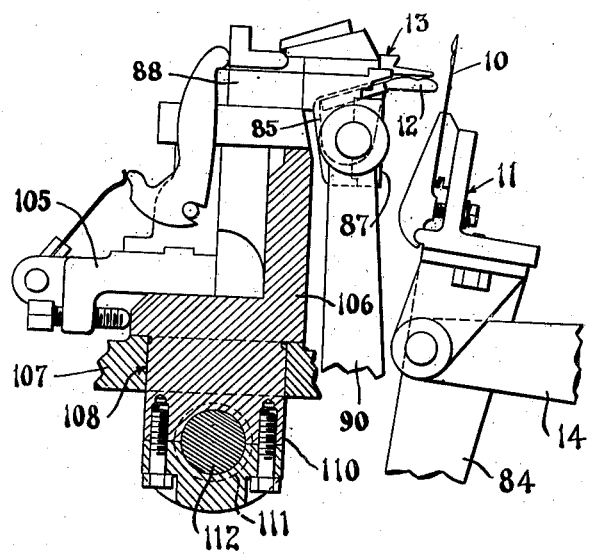
Figure 17 is a fragmentary side elevational view, partly in section, illustrating mechanism for shifting the sinkers and dividers longitudinally of the frame with respect to the needles.
Figure 18:
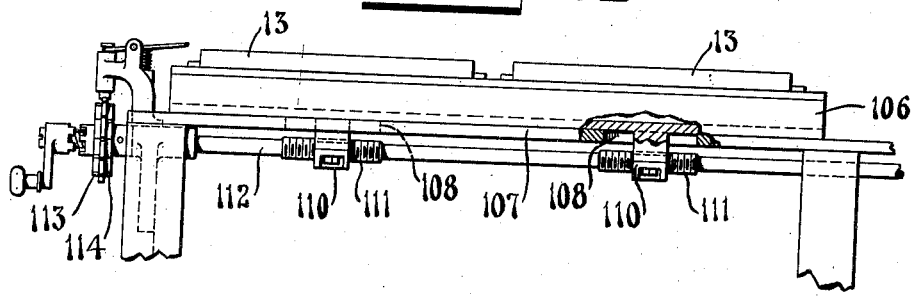
Figure 18 is a front elevational view corresponding to Figure 17, certain parts being shown in section.

As shown in Figures 17 and 18, the sinker bed 88 and the jack bed 105 are supported by a member 106 which is slidably mounted on the longitudinally extending part 107 of the machine frame. The latter is provided with slots 108 through which lugs 110 on the supporting member 106 extend. The lugs 110 are provided with threaded apertures in which threaded portions 111 of a shaft 112 are engaged so that on rotation of the shaft the supporting member 106, together with the sinkers and dividers, etc., carried thereby, may be shifted in either direction longitudinally of the line of needles 10. The shaft 112 has secured thereto a pair of oppositely cut ratchets 113 and 114, (Figure 18). The ratchets 113 and 114 correspond to the ratchets 32 and 33 (Figures 9 and 11) and are similarly selectively controlled and operated from the main cam shaft by a reciprocatory member.

If desired, the knock-over bit bed 85 might be moved along with the sinker bed 88. However, as shown in Figure 16, provision is made to permit the sinker bed 88 to be moved with respect to the knock-over bit bed 85 because of the clearance provided between the latter and the members 87 which support the latter from the sinker bed. Thus, the knock-over bit bed 85 may remain stationary when the sinker bed is shifted as the bracket members 87 slide on the trunnions 86 of the knock-over bit bed.

Transferring the fabric

A transfer bar 115 (Figure 16) is provided with a point 116 for each needle so that when dipped and raised to take the entire fabric from the aligned needles it may be shifted a desired number of needle spaces in either direction and again dipped, and subsequently raised, to place the fabric on adjacent needles, thus changing the relationship of the fabric wales to the needles, sinkers, etc.

The dipping operations of the fabric transfer bar 115 to take the entire fabric from the needles and then re-engage it with other needles are effected by the usually provided "lace point" dipping mechanism, which being well understood is neither shown nor described herein. However, because this mechanism does not provide for the varied shifting movements of the fabric along the line of needles that are contemplated herein, the following special mechanism is utilized for shifting the fabric transfer bar 115 and fabric engaged by the points 116 thereof. The bar 115 is supported by brackets 121 from the bar 120 forming part of the conventional dipping mechanism 122. A spring 127 acts against a collar 128 on bar 120 to maintain the end thereof engaged with a stop 123 mounted on an axially movable stub shaft 124. The shaft 124 is provided with oppositely acting ratchets 125, 126 operated by a reciprocable member similar to those provided for shifting the needle bar, carrier-rod end-stops etc., as described above.

When the fabric transfer bar 115 has been dipped and raised to take the fabric from the needles and retain it temporarily on the points 116, the bar may be shifted either to the right or left to a desired extent, when bar 120 engages stop 123 during the second dipping operation, to align the points 116 with other needles (spaced from those engaging the respective loops during knitting of the previous course) for transferring the fabric thereto. Upon actuation of ratchet 125 the stop 123 is moved to the right pushing the bar 120 and hence points 116 in the same direction to the extent determined by the extent of ratchet operation. Upon operation of ratchet 126 the stop 123 is moved to the left and spring 127 causes bars 120, 115 and hence the fabric transfer points 116 to follow its movement.

If desired, by subsequently shifting the needle bar to the same extent to which the fabric was shifted but in the opposite direction it becomes unnecessary to shift the carrier-rod end-stops because the fabric although held by different needles is thus returned to its previous relation with the yarn carriers.

The operation

The mechanisms described above provide for shifting (in either direction to a desired extent) of the needles, with or without the knock-over bits, of the carrier-rod end-stops, of the narrowing rod stops, of the sinkers and dividers, or of the entire fabric. In operation the shifting of any of these changes their position with relation to other parts of the loop forming and knitting mechanism so that the relations between the latter and the fabric loops may be varied after the formation of each, or several, of the successive courses.

As mentioned above, Figure 1 represents a sinker or needle line produced by recurrence of imperfect loops in the same wale course after course. The effect of variations of the relative positions of the loops and parts of the knitting mechanism is to disperse imperfect loops over a plurality of wales as the fabric is knit and in this way alignment of these loops to form such a line of loops contrasting with more perfect loops in adjacent wales is prevented.

Figure 2:
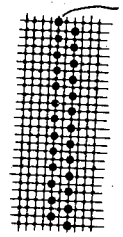
Figures 2 to 7 are similar diagrams illustrating the application of the methods of the present invention to disperse the imperfect loops among a number of different wales in successively knit courses for the purpose of eliminating the "sinker lines" or "needle lines" by preventing alignment of all the imperfect loops in a single wale.

In Figure 2 the staggered relation of the enlarged dots $a$, representing imperfect loops, illustrates the dispersion of these loops by effecting shiftings of the needle bar or other shiftable part to the extent of one step, or two needle spaces, first to the right and then to the left, alternating in successive courses.

Figure 3:
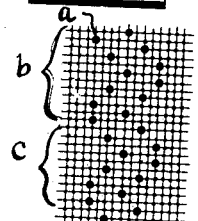

Figure 3 illustrates another operating mode by effecting shifts of two steps to the left and three steps to the right in alternation while knitting each of a series of five courses. After formation of the fifth course, shifts of two steps to the right and of three steps to the left are effected in alternation, the complete cycle of ten courses being designated by $b$. After knitting of the tenth course a two step shift to the left begins the cycle over again, the second ten course cycle being indicated at $c$.

Figure 4:
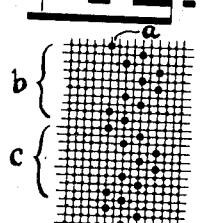

Figure 4 represents a shifting cycle in which the fabric or a part of the knitting mechanism is shifted alternately one step to the left and two steps to the right for the first five courses. Through the sixth to the tenth courses the shiftings are alternately one step to the right and two steps to the left. After knitting of the tenth course, a one step shift to the left is effected and the shifting cycle repeated.

In Figures 5 to 7 the fabric or knitting elements periodically selected for shifting are shifted after a desired number of courses, illustrated as three, have been knit. In Figure 5 after the third course the shift is one step to the left, with a two step shift to the right after the sixth course. After knitting of the twelfth and eighteenth courses a one step shift to the right is effected with an intermediate two step shift to the left subsequent to knitting of the fifteenth course. The knitting cycle recommences with the nineteenth course by a one step shift to the left occurring after the twenty-first course.

Figure 6 represents a fabric produced by a number of periodic shifts made successively in the same direction followed by a shift in the opposite direction to the starting point before beginning the next cycle. As represented, the shifts that take place are one step to the right after each of the third, sixth and ninth courses and a three step shift to the left after kniting of the twelfth course, the cycle recommencing with a one step shift to the right after the fifteenth course is knit.

Figure 7 represents a procedure in which a number of shifts in one direction are followed by a number of shifts in an opposite direction before repetition of the cycle. The diagram indicates a one step shift to the right after the third and sixth courses, a two step shift to the right after the ninth course, whereupon the direction of shifting is reversed and one step shifts to the left are effected after the twelfth and fifteenth courses and a two step shift to the left after the eighteenth course. The cycle recommences after the eighteenth course with a one step shift to the right after the twenty-first course.

It will be understood from the foregoing description of the apparatus that the single or multi-step shifts which are effected may be of any of the shiftable elements, such as the needles, the sinkers and dividers, or the fabric itself. When it is desired to effect a shift of more than one step, for example three steps or six needle spaces, several of the displaceable elements may be shifted in the same or opposite directions at the same time after knitting of a course and prior to formation of the loops for the next course. As an illustration, to effect the three step, or six needle space, shift to the right after the second course in Figure 3, or a similar movement to the left after the twelfth course in Figure 6, the needle bar might be shifted one step in one direction while the sinkers and dividers are shifted two steps in the opposite direction. This results in displacing a needle and the fabric loop thereon six needle spaces with respect to the sinkers and dividers adjacent which the needle was positioned during formation of the previous course.

When the needles and sinkers and dividers are shifted relatively to each other (regardless of which of these is actually moved) their relative positions are so changed that when an imperfect loop is produced by a defective or improperly alined needle, or sinker or divider, etc., the imperfect loop will not recur in the same wale when the next course is formed and knit. When the entire fabric is displaced from engagement with needles knitting a particular course to engagement with other needles prior to formation of the next course, a similar result is obtained. Here also the imperfect loop will appear in a different course regardless of whether the needle or a sinker or a divider is the defective element.

Where subsequently to transfer of the fabric the needle bar is shifted in the opposite direction to the same extent in order to eliminate shifting of the carrier-rod end-stops, the position of the wales of the fabric relatively to the sinkers and dividers is not changed. Accordingly, although an imperfect loop produced by a defective needle would occur in a different wale, the loop would reappear in the same wale in the event that the sinker or divider were the defective element, because the relation of these parts to the wales is the same as in the previous course.

However, inasmuch as by proper designs of the cams controlling the shiftings, one set of elements may be shifted to a certain extent while another set is shifted at the same time to a different extent it is possible to relate the shiftings to each other so that in no case would imperfect loops recur in the same wale of successive courses between the knitting of which the elements have been shifted.

It will be apparent that the shifting of the needle bar to the same extent as transfer of the fabric in the opposite direction is availed of in order to obviate the necessity of shifting the carrier-rod end-stops and narrowing rod stops also. The necessity of shifting the narrowing rod stops to maintain the narrowing points aligned with the fabric may also be obviated by restoring shifted parts, whether fabric or needles to the same position with relation to the narrowing points at the time of narrowing as they were in at the termination of the preceding narrowing. It is apparent that the diagrams of Figures 1 to 7 serve to indicate the relative positions of shifted parts with respect to each other, as well as to represent the wale-positions of imperfect loops.

In Figure 6 as an illustration, the lateral spacing between dots for the first three courses and the dots $a'$ might indicate that the needles and carriers were shifted two needle spaces to the right with respect to the sinkers and dividers after the third course. The dots $a''$ for the twenty-fourth to twenty-seventh courses are in the same wale-relation as those for the fourth to sixth courses. Thus, the relation of the needles with fabric loops thereon and the thread carriers to the narrowing points is the same in the twenty-fourth to twenty-seventh courses as it was in the fourth to sixth courses and hence the shifted parts have been restored to the same relative positions. Therefore, a narrowing after any of the twenty-fourth to twenty-seventh courses would take place with the narrowing points in the same position with respect to the edges of the fabric as they were in for a narrowing after any of the fourth to sixth courses.

Accordingly, if when narrowings are to be effected the shifted parts are restored to any preferred position, such as is indicated by $a'$, $a''$, in which the relative positions of the parts are the same as at the end of the last narrowing, it becomes unnecessary to shift the narrowing rod stops at the same time the needles and carrier rod end stops are shifted after each course or several courses.

Forming a pattern

As stated in the early part of this description a fabric having a patterned effect may be produced by wilfully introducing at certain points in a series, elements such as needles, sinkers or dividers which are defective in the sense that they are not exactly of the same size or condition of wear as other elements. The introduction of such elements results in forming loops that are larger, or smaller, than those in adjacent wales. Then by varying the position of the fabric loops relatively to the loop forming and knitting elements, in any of the ways described above, a patterned effect is produced.

Figure 21 illustrates a series of sinkers and dividers of which alternate dividers have been replaced by others which are longer than those adjacent thereto. The sinkers S draw thread as indicated in dotted lines when the thread carriers travel along a line of needles. Upon projection of the dividers in the usual manner, the sinkers are retracted somewhat and the dividers D—1, 3, 5 and 7, etc., take more thread than the intermediate dividers D—2, etc., with the result that the loops $y$ in the corresponding wales are larger than those formed by sinkers and dividers which have not been replaced.

Figure 22 shows the operation when alternate sinkers have been replaced by sinkers longer than the remainder of the series. Consequently as the thread carriers travel along the line of needles, the sinkers S—1, 3, 5 and 7, etc., take more thread than the adjacent sinkers. Hence upon projection of the dividers, the sinkers S—1, etc., are not retracted to the same extent as the adjacent sinkers, and accordingly the loops $z$ are of larger size than the loops in the adjacent wales.

Having intentionally produced in certain wales loops that are of different size than those in adjacent wales, a patterned effect may be produced by shifting the needles, the sinkers and dividers, or the fabric itself after knitting of each course (Figure 19) or periodically after formation of several courses (Figure 20). These figures illustrate a two-needle space shift of the elements or the fabric, but it is to be understood that other shifting distances may be adopted. Moreover, the parts which are replaced need not be alternate ones but may be at other intervals within practical limits, as may be determined in practicing the invention.

Similar results may be attained by replacing certain needles with others which are shorter to draw looser loops or longer to draw tighter loops.

The shift diagrams of Figures 2 to 7, 19 and 20 are merely illustrative of a few of the many different degrees of shifting that may be effected in order to carry into practice the underlying idea of varying the positions of the wales of the fabric with respect to the loop forming and knitting elements in the period between knitting of the loops of one course and formation of the loops of the succeeding course in order to attain the desired result of preventing recurrence of imperfect loops in the same wale in course after course as the fabric is knit whether for the purpose of eliminating "needle" or "sinker" lines or to produce a patterned effect in the fabric.

It is also to be understood that the mechanisms shown and described herein for displacing certain parts of the knitting mechanism with respect to each other are merely illustrative of mechanisms that may be employed in practicing the methods disclosed herein. Inasmuch as there are many variations that may be made in the detailed construction of apparatus for carrying out the invention and in the steps embodied in the methods, and in the sequence of the steps, without departing from the invention, it is desired and intended that all such changes and variations be included within the scope of the appended claims.

I claim:

1. The method of knitting hosiery fabric and the like on a straight type knitting machine to break up lines in the wales of the fabric that are caused by defective knitting elements or improper cooperation thereof which comprises; forming and knitting a plurality of successive courses; and repeatedly during knitting of the fabric, in the periods between the knitting of certain courses and the formation of the loops of the next succeeding courses, determinedly varying the positions of all the fabric loops relatively to the loop forming and knitting elements to distribute loops formed by defective elements through a plurality of wales of the knit fabric.

2. The method of knitting hosiery fabric and the like on a straight type knitting machine to avoid the appearance of contrasting lines in the wales of the fabric that are caused by defective knitting elements or improper cooperation thereof, which comprises; forming and knitting a plurality of successive courses; and repeatedly during knitting of the fabric, in the periods between the knitting of certain courses and the formation of the loops of the next succeeding courses, selectively shifting the fabric loops, the loop forming and the knitting elements longitudinally relatively to each other for determinedly varying their cooperative relationships to distribute loops formed by each loop forming element through a plurality of wales in the knit fabric.

3. The method of producing hosiery fabric and the like on a straight type knitting machine which comprises; forming and knitting a plurality of successive courses; and repeatedly during knitting of the fabric, in the periods between the knitting of certain courses and the formation of the loops of the next succeeding courses, shifting the needles longitudinally with respect to the sinkers and dividers and correspondingly shifting the carrier-rod end-stops to maintain the carriers aligned with the fabric.

4. The method of producing hosiery fabric and the like on a straight type knitting machine which comprises; forming and knitting a plurality of successive courses; and repeatedly during knitting of the fabric, in the periods between the knitting of certain courses and the formation of the loops of the next succeeding courses, shifting the loops of the needles and knock-over bits longitudinally with respect to the sinkers and dividers; and correspondingly shifting the carrier-rod end-stops to maintain the carriers aligned with the fabric.

5. The method of producing hosiery fabric and the like on a straight type knitting machine which comprises; forming and knitting a plurality of successive courses; and repeatedly during knitting of the fabric in the periods between the knitting of certain courses and the formation of the loops of the next succeeding courses, shifting the needles longitudinally with respect to the sinkers and dividers; and correspondingly shifting the carrier-rod end-stops and the narrowing rod stops to maintain the carriers and narrowing points aligned with the fabric.

6. The method of producing hosiery fabric and the like on a straight type knitting machine which comprises; forming and knitting a plurality of successive courses; and repeatedly during knitting of the fabric, in the periods between the knitting of certain courses and the formation of the loops of the next succeeding courses, moving the sinkers and dividers longitudinally of the line of needles to vary their positions relative to the fabric on the needles, moving the needles to further vary the relative position of the fabric and sinkers, and moving the carrier-rod end-stops and narrowing stops in the same direction and to the same extent as the movement of the needles to maintain the thread carriers and narrowing points aligned with the fabric.

7. The method of producing hosiery fabric and the like on a straight type knitting machine which comprises; forming and knitting a plurality of successive courses; and repeatedly during knitting of the fabric transferring the entire fabric from the needles engaged during knitting of a determined course to other needles spaced therefrom prior to knitting of the succeeding course, and shifting the carrier-rod end-stops in the direction and to the extent of transfer of the fabric to maintain the thread carriers aligned therewith.

8. The method of producing hosiery fabric and the like on a straight type knitting machine which comprises; forming and knitting a plurality of successive courses; and repeatedly during knitting of the fabric transferring the entire fabric a determined distance in one direction from engagement with needles knitting certain courses to other needles adjacent thereto prior to the formation of the next succeeding courses, and moving the needles to the extent of but in the opposite direction to the transfer movement of the fabric for maintaining the latter aligned with the thread carriers.

9. In a knitting machine of the Cotton type having a frame and a plurality of loop forming and knitting elements including a series of needles and a plurality of sinkers and dividers; means associated with the needles and frame adapted to move the needles longitudinally of the frame to vary their positions with respect to the sinkers and dividers; supporting means for the sinkers and dividers movable longitudinally of the frame to vary their positions with respect to the needles; means for transferring a fabric from needles retaining the loops thereof to other needles spaced therefrom. including a loop transfepoint engageable with each loop of the fabric; and selectively operable means for moving the needles, the sinkers and dividers, and the fabric transfer points longitudinally of the frame to vary the positions of the fabric loops with respect to loop forming and knitting elements.

10. In a knitting machine of the Cotton type having a frame, a series of needles and corresponding series of sinkers and dividers; selectively operable means for moving the needles and sinkers and dividers relatively to each other longitudinally of said frame for dispersing among a plurality of wales the markings produced in the fabric because of defective co-operation between certain needles and the sinkers and dividers that normally correspond therewith.

11. In a knitting machine of the Cotton type; a frame; a series of needles mounted for movement longitudinally of the frame; corresponding series of sinkers and dividers; a series of knockover bits mounted for movement longitudinally of the frame; and means for simultaneously moving the needles and knockover bits along the frame to change their positions longitudinally thereof with respect to the sinkers and dividers.

12. In a knitting machine of the Cotton type; a frame; a series of needles mounted for movement longitudinally of the frame; corresponding series of sinkers and dividers; a series of end stops controlling the travel of thread carrier rods; means for moving the needles longitudinally of the frame to change their positions with respect to the sinkers and dividers; and means for correspondingly moving the series of carrier rod end stops to maintain the thread carriers aligned with the fabric on the needles.

13. In a knitting machine of the Cotton type; a frame; a series of needles mounted for movement longitudinally of the frame; corresponding series of sinkers and dividers; a series of end stops controlling the travel of thread carriers; a series of narrowing stops controlling the positions of narrowing points; means for moving the needles longitudinally of the frame to change their position with respect to the sinkers and dividers; and means for correspondingly moving the carrier rod end stops and narrowing end stops to maintain the thread carriers and narrowing points in alignment with the fabric.

14. In a knitting machine of the Cotton type having a frame, a series of needles, and corresponding series of sinkers and dividers; means for transferring a fabric from the needles retaining the loops thereof to other needles spaced therefrom including a loop transfer point engageable with each loop of the fabric; and means associated with said movable transfer points for moving them longitudinally of the frame to transfer an entire fabric from needles retaining the loops thereof to other needles spaced therefrom in the periods between knitting of certain courses and the formation of the loops for the next succeeding courses.

15. In a knitting machine of the Cotton type having a frame, a series of needles mounted for movement longitudinally of said frame, thread carriers for supplying thread to the needles, and sinkers and dividers co-operating with the needles to form loops from the threads supplied thereto; means for transferring a fabric from the needles retaining the loops thereof to other needles spaced therefrom including a loop transfer point engageable with each loop of the fabric; means associated with said loop transfer points for moving them along said frame to transfer an entire fabric longitudinally of the frame; and means for moving said needles along the frame to the same extent but in the opposite direction to the transfer movement of the fabric for maintaining the latter aligned with the thread carriers.

16. In a knitting machine of the Cotton type having a frame, a camshaft and a series of elements mounted for movement longitudinally of the frame; a shaft associated with said elements and provided with a ratchet operable to effect said movement of said elements; a member reciprocable by said camshaft; a pawl carried by said member and engageable with said ratchet; pattern means acting on said pawl to determine its period of engagement with said ratchet during reciprocation of said member for controlling the extent of movement of said elements along said frame; and means operable by said member during reciprocation thereof for actuating said pattern means to vary the extent of movement of said elements along said frame.

17. The method of producing hosiery fabric and the like on a straight type knitting machine which comprises; forming and knitting a plurality of successive courses; and repeatedly during knitting of the fabric, in the periods between the knitting of certain courses and the formation of the loops of the next succeeding courses, selectively and determinedly relatively shifting the sinkers and dividers and the needles to vary their relative longitudinal positions for dispersing among a plurality of wales the markings produced in the fabric because of defective co-operation between certain needles and the sinkers and dividers that normally correspond therewith.

18. The method of producing on a "Cotton type" knitting machine a hosiery fabric which is of substantially uniform visual appearance throughout and free from sinker lines or the like that impair the appearance and quality of the fabric comprising; forming and knitting a plurality of successive courses; and repeatedly during knitting of the fabric, in the periods between the knitting of certain courses and the formation of the loops for the next succeeding courses, moving the sinkers and dividers longitudinally of the line of needles to vary their positions relatively to the needles and the fabric loops engaged thereby for dispersing among a plurality of wales the markings produced in the fabric by defects in or improper cooperation between certain needles and the sinkers and dividers that normally correspond therewith.

19. The method of producing fashioned hosiery fabrics and the like on a straight type knitting machine which comprises; forming and knitting a plurality of successive courses; periodically fashioning the fabric by transferring loops thereof by means of narrowing points; repeatedly shifting the needles longitudinally with respect to the sinkers and dividers, in the periods between the knitting of certain courses and the formation of the loops of the next succeeding courses, to vary the positions of the needles with respect to the sinkers and dividers; and before each fashioning of the fabric returning the needles to the same positions with respect to the narrowing points which they occupied at the termination of the preceding narrowing.

20. The method of producing fashioned hosiery fabrics and the like on a straight type knitting machine which comprises; forming and knitting a plurality of successive courses; periodically fashioning the fabric by transferring loops thereof by means of narrowing points; repeatedly shifting the needles longitudinally with respect to the sinkers and dividers, in the periods between the knitting of certain courses and the formation of the loops of the next succeeding courses, to vary the positions of the needles with respect to the sinkers and dividers for dispersing among a plurality of wales the markings produced in the fabric by defective knitting elements or improper cooperation thereof; shifting the carrier rod end stops correspondingly to maintain the carriers aligned with the fabric; and before each fashioning of the fabric returning the needles and carrier rod end stops to the same positions with respect to the narrowing points which they occupied at the termination of the preceding narrowing.

21. The method of producing fashioned hosiery fabrics and the like on a straight type knitting machine which comprises; forming and knitting a plurality of successive courses; periodically fashioning the fabric by transferring loops thereof by means of narrowing points; repeatedly transferring the entire fabric from the needles engaged during knitting of determined courses to other needles spaced therefrom prior to the knitting of the succeeding courses; and before each fashioning of the fabric returning the latter to the same position with respect to the narrowing points which it occupied at the termination of the preceding fashioning.

22. The method of producing a pattern in a knitted fabric which comprises replacing a plurality of sinkers at certain intervals in a line thereof with sinkers which vary in length as compared with the length of the other sinkers in said line to cause forming and knitting of looms differing in size from but identical in construction with those formed by said other sinkers; and repeatedly during knitting of the fabric, in the periods between knitting of certain courses and formation of the loops for the next succeeding courses, varying the positions of all the fabric loops with respect to the line of sinkers for dispersing said differently formed loops among a plurality of fabric wales.

23. The method of producing a pattern in a knitted fabric which comprises replacing a plurality of dividers at certain intervals in a line thereof with dividers which vary in length as compared with the length of the other dividers in said line to cause forming and knitting of loops differing in size from but identical in construction with those formed by said other dividers; and repeatedly during knitting of the fabric, in the periods between knitting of certain courses and formation of the loops for the next succeeding courses, varying the positions of all the fabric loops with respect to the line of dividers for dispersing said differently formed loops among a plurality of fabric wales.

24. The method of producing a pattern in a knitted fabric which comprises replacing a plurality of sinkers and dividers at certain intervals in a line thereof with sinkers and dividers which vary in length as compared with the length of the other sinkers and dividers in said line to cause forming and knitting of loops differing in size from but identical in construction with those formed by said other sinkers and dividers; and repeatedly during knitting of the fabric, in the periods between knitting of certain courses and formation of the loops for the next succeeding courses, varying the positions of all the fabric loops with respect to the line of sinkers and dividers for dispersing said differently formed loops among a plurality of fabric wales.

25. The method of producing a pattern in a knitted fabric which comprises replacing a plurality of needles at certain intervals in a line thereof with other needles which do not conform to the average needle in said line to cause forming and knitting of loops differing from those formed by the average needle and repeatedly during knitting of the fabric, in the periods between knitting of certain courses and formation of loops for the next succeeding courses, varying the positions of all the fabric loops with respect to the line of needles for dispersing said differently formed loops among a plurality of fabric wales.

26. The method of knitting hosiery fabric and the like on a straight type knitting machine having a plurality of needles in a line to avoid the appearance of contrasting lines in the wales of the fabric that are caused by defective knitting elements or improper cooperation thereof which comprises forming and knitting a plurality of successive courses, and repeatedly during knitting of the fabric and in the periods between knitting of certain courses and the formation of the loops for the next succeeding courses transferring the entire fabric from the needles engaged during knitting of a determined course to other needles in the line prior to knitting of the succeeding course.

27. The method of producing hosiery fabric and the like set forth in the preceding claim including the step of narrowing the fabric.

28. The method of producing hosiery fabric and the like on a straight type knitting machine which comprises forming and knitting a plurality of successive courses, and repeatedly during knitting of the fabric, in the periods between the knitting of certain courses and the formation of the loops of the next succeeding courses, shifting the needles and the fabric longitudinally with respect to the sinkers and dividers to bring individual needles into cooperation with sinkers and dividers other than those with which said individual needles cooperated prior to the shifting movement thereof, to form loops for the next succeeding courses so that any loops varying in size or shape due to certain defective sinkers or dividers will be distributed among a plurality of wales, thereby avoiding formation of contrasting lines or bands normally formed by alignment of such varying loops.

29. In a knitting machine of the Cotton type, a series of sinkers and dividers, a series of needles shiftable longitudinally with respect to said series of sinkers and dividers for cooperation therewith in knitting fabric loops, and means for shifting said needles and the fabric between the knitting operation of certain adjacent courses for placing individual needles in cooperation with sinkers and dividers other than those with which the individual needles cooperated prior to the shifting movement thereof, whereby any loops varying in size or shape from other loops in the same course will be distributed among a plurality of wales, thereby avoiding formation of contrasting lines or bands normally formed by alignment of such varying loops.

HANS P. LUHN.